3,652,585
1-(PHENYL LOWER ALKYL)-4,5,6,7-TETRAHYDRO-INDOLES AND METHODS OF PREPARING SAME

William Alan Remers, Suffern, N.Y., and Martin Joseph Weiss, Oradell, N.J., assignors to American Cyanamid Company, Stamford, Conn.
No Drawing. Filed Jan. 6, 1970, Ser. No. 1,042
Int. Cl. C07d 27/54
U.S. Cl. 260—319.1
8 Claims

ABSTRACT OF THE DISCLOSURE

This disclosure describes compounds of the class of 1-(phenyl lower alkyl)-4,5,6,7-tetrahydroindoles useful as antibacterial, antifungal and diuretic agents.

BRIEF SUMMARY OF THE INVENTION

This invention relates to new organic compounds and, more particularly, is concerned with novel 1-(phenyl lower alkyl)-4,5,6,7-tetrahydroindoles and with methods of preparing these compounds. The novel compounds of the present invention may be represented by the following general formula:

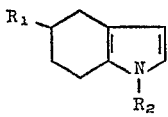

wherein $R_1$ is hydrogen or phenyl and $R_2$ is phenyl lower alkyl. Suitable phenyl lower alkyl groups contemplated by the present invention are those having from 7 to 9 carbon atoms such as, for example, benzyl, α-phenylethyl, β-phenylethyl, α-phenyl-n-propyl, β-phenyl-n-propyl, γ-phenyl-n-propyl, etc.

DETAILED DESCRIPTION OF THE INVENTION

The novel compounds of the present invention are generally obtainable as colorless oils or white crystalline materials of low melting point having characteristic absorption spectra and which may be purified by distillation or by recrystallization from common organic solvents such as diethyl ether or n-hexane. They are appreciably soluble in many organic solvents such as methanol, ethanol, acetone, chloroform, and the like but are sparingly soluble in water.

The novel 1-(phenyl lower alkyl)-4,5,6,7-tetrahydroindoles of the present invention may be readily prepared from 4-oxo-4,5,6,7-tetrahydroindole as illustrated in the following reaction scheme:

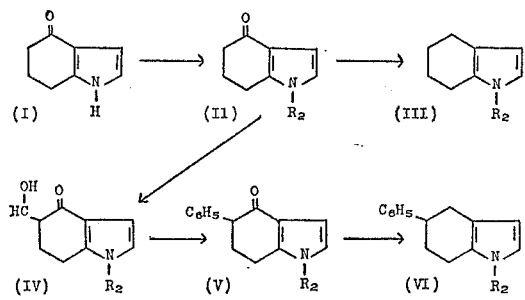

wherein $R_2$ is phenyl lower alkyl. In accordance with the above reaction scheme, the intermediate 1-(phenyl lower alkyl)-4-oxo-4,5,6,7-tetrahydroindole (II) may be readily prepared from 4-oxo-4,5,6,7-tetrahydroindole (I) by treatment with a phenyl lower alkyl halide such as benzyl bromide, β-phenylethyl chloride, γ-phenylpropyl chloride, α-methyl-β-phenylethyl bromide, α,α-dimethylbenzyl bromide, and the like. This reaction is best carried out by first stirring a mixture of 4-oxo-4,5,6,7-tetrahydroindole (I) in a solution of methylsulfinyl carbanion in dimethylsulfoxide under an inert atmosphere for a few hours at room temperature. The phenyl lower alkyl halide is then added and stirring at room temperature is continued for a period of 10-20 hours. Dilution of the reaction mixture with water precipitates the desired product (II). Conversion of the 1-(phenyl lower alkyl)-4-oxo-4,5,6,7-tetrahydroindole (II) to the corresponding 1-(phenyl lower alkyl)-4,5,6,7-tetrahydroindole (III) is accomplished by means of the standard Wolff-Kishner reduction of the hydrazone derivative of (II). Extraction of the reaction mixture with benzene followed by concentration of the extract provides the product (III).

Conversion of the 1-(phenyl lower alkyl)-4-oxo-4,5,6,7-tetrahydroindole (II) to the corresponding 1-(phenyl lower alkyl)-5-hydroxymethylene-4 - oxo-4,5,6,7-tetrahydroindole (IV) is accomplished by treatment with ethyl formate in the presence of a base such as sodium methoxide or sodium ethoxide. This reaction is best carried out in an anhydrous solvent such as benzene or toluene at a temperature of from about 20° C. to the reflux temperature for a period of time of 15-20 hours. The product (IV) may be extracted from the reaction mixture with aqueous sodium hydroxide. Extraction of the acidified aqueous extract with an organic solvent followed by concentration of the organic extract provides the product (IV). Treatment of a 1-(phenyl lower alkyl)-5-hydroxymethylene-4-oxo-4,5,6,7-tetrahydroindole (IV) with diphenyliodonium chloride in the presence of a sodium lower alkoxide affords the corresponding 1-(phenyl lower alkyl)-5-phenyl-4-oxo-4,5,6,7-tetrahydroindole (V). This reaction is best carried out in anhydrous lower alkanols as solvent at reflux temperature for a period of time of about 20 hours. The reaction mixture is then concentrated, diluted with water, and extracted with an organic solvent. Concentration of the organic extract provides the product (V). Conversion of a 1-(phenyl lower alkyl)-5-phenyl-4-oxo-4,5,6,7-tetrahydroindole (V) to the corresponding 1-(phenyl lower alkyl)-5-phenyl-4,5,6,7-tetrahydroindole (VI) is accomplished by means of reduction with lithium aluminum hydride. This reduction can be carried out in diethyl ether as solvent at room temperature for a period of about 24 hours. The novel 1-(phenyl lower alkyl)-5-phenyl-4-oxo-4,5,6,7-tetrahydroindoles (V) are thus useful intermediates for the preparation of the 1-(phenyl lower alkyl)-5-phenyl-4,5,6,7-tetrahydroindoles (VI).

The novel 1-(phenyl lower alkyl)-5- phenyl-4,5,6,7,-tetrahydroindoles of the present invention are useful as antibacterial and antifungal agents and possess broad-spectrum antibacterial and antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. A second set of agar dilutions is prepared identical to the first except that the nutrient agar is designed to support the growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria and yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial or fungal growth is noted. The minimal inhibitory concentration (expressed in micrograms per milliliter) is defined as the concentration of test compound causing complete inhibition of growth of any particular organism.

In a representative operation, and merely by way of illustration, the minimal inhibitory concentration of 1-benzyl-5-phenyl-4,5,6,7-tetrahydroindole against a variety of test organisms as determined in the above-described assay are set forth in Table I below:

TABLE I

| Organism: | Minimal inhibitory conc. (mcg./ml.) |
| --- | --- |
| Streptococcus pyogenes C 203 | 62 |
| Microsporum canis ATCC 10214 | 62 |
| Mycobacterium smegmatis ATCC 606 | 62 |
| Cryptococcus neoformans E 138 | 250 |
| Microsporum gypseum ATCC 14683 | 250 |
| Trichophyton tonsurans NIH 662 | 250 |
| Trichophyton mentagrophytes E 11 | 250 |
| Trichophyton rubrum E 97 | 250 |

The novel 1-(phenyl lower alkyl)-4,5,6,7-tetrahydroindoles of the present invention possess diuretic properties as determined by animal experiments as follows. Four cages (two rats per cage) of mature male rats weighing between 180 and 300 grams were allowed a normal fluid intake prior to testing. The single oral administration of 400 micrograms of the test compound was given in 0.5 ml. of 2% aqueous starch suspension. Four cages (two rats per cage) served as controls for each measurement. Control animals received only the starch suspension. After administration, the test animals were placed in metabolism cages. Observations of the amount of urine excreted were made after 5 hours and after 24 hours. These urine measurements were then adjusted to compensate for differing weights of individual animals. The final values recorded were the ratios of the amount of urine excreted by the test rats to the amount of urine excreted by the control rats. In a representative operation, and merely by way of illustration, the percent increase in urine volume over the controls caused by 1-benzyl-4,5,6,7-tetrahydroindole in the above-described test was 32%.

The novel compounds of the present invention may be administered as active components of compositions for administration in unit dosage form as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums, and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coatings comprises a styrene maleic acid copolymer together with known materials contributing to the enteric properties of the coating.

The liquid forms in which the novel compounds of the present invention may be incorporated for administration include aqueous solutions, suitably flavored syrups, aqueous or oil suspensions, flavored emulsions with edible oils such as cottonseed oil, sesame oil, coconut oil, peanut oil, and the like, as well as elixirs and similar pharmaceutical vehicles. Suitable dispersing or suspending agents for aqueous suspensions include synthetic and natural gums such as tragacanth, acacia, alginic acid, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for parenteral use.

Topical preparations containing the 1-(phenyl lower alkyl) - 5 - phenyl - 4,5,6,7 - tetrahydroindoles, it is expected, will prove particularly useful. Such compositions would be designed for administration to subjects exposed to, or infected with sensitive bacteria or fungi for either treatment or prophylaxis and may include, in addition to the foregoing, ointments, creams, emulsions, unguents, salves, emollients, sprays, washes or the like. In addition, compounds of this invention may be used in the form of solutions, suspensions, emulsions, washes, powders, dusts, mists, soaps, sprays, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection of contamination with sensitive bacteria or fungi. Painting, spraying, immersion or other means of effecting contact may be applied.

The invention will be described in greater detail in conjunction with the following specific examples.

EXAMPLE 1

Preparation of 1-benzyl-4-oxo-4,5,6,7-tetrahydroindole

A solution of methylsulfinyl carbanion in dimethyl sulfoxide, prepared from 5.8 g. of 55% sodium hydride in mineral oil and 50 ml. of dimethyl sulfoxide [J. Org. Chem. 28, 1128 (1963)], is treated with 16.4 g. of 4-oxo-4,5,6,7-tetrahydroindole [Ann. Chem. 655, 20 (1962)]. The mixture is stirred under nitrogen for 2 hours and treated with 15.4 g. of benzyl chloride. After 17 hours the resulting solution is diluted with water until no more crystals separate. This procedure gives 20.8 g. of the desired product as white prisms, melting point 80–81.5° C. after recrystallization from methylene chloride-hexane.

EXAMPLE 2

Preparation of 1-(α-phenylethyl)-4-oxo-4,5,6,7-tetrahydroindole

By replacing the benzyl chloride employed in Example 1 with an equimolecular quantity of α-phenylethyl chloride and following substantially the same procedure described in Example 1, there is obtained the 1-(α-phenylethyl)-4-oxo-4,5,6,7-tetrahydroindole.

EXAMPLE 3

Preparation of 1-(β-phenylethyl)-4-oxo-4,5,6,7-tetrahydroindole

The procedure of Example 1 is repeated, substituting an equimolar amount of β-phenylethyl bromide for the benzyl chloride employed in that example. There is thus obtained the 1-(β-phenylethyl)-4-oxo-4,5,6,7-tetrahydroindole.

EXAMPLE 4

Preparation of 1-benzyl-4,5,6,7-tetrahydroindole

A mixture of 5.62 g. of 1-benzyl-4-oxo-4,5,6,7-tetrahydroindole, 10 ml. of hydrazine hydrate, and 200 ml. of benzene is heated in a Dean-Stark apparatus for 21 hours. It is then concentrated under pressure and the residue is treated with 5.0 g. of powdered potassium hydroxide, 3 ml. of hydrazine hydrate and 150 ml. of diethylene glycol. The resulting solution is heated at 100° C. for one hour, concentrated partially and then heated at reflux temperature for 5 hours. It is then cooled and extracted with benzene. This extract is washed with water, dried, and concentrated. The residual oil is distilled as reduced pressure, which furnishes the desired product (4.1 g.) as a colorless liquid, B.P. 185–188° C. at 8 mm.

EXAMPLE 5

Preparation of 1-(α-phenylethyl)-4,5,6,7-tetrahydroindole

In place of the 1-benzyl-4-oxo-4,5,6,7-tetrahydroindole of Example 4, there is employed an equimolecular quantity of 1-(α-phenylethyl)-4-oxo-4,5,6,7 - tetrahydroindole whereby the 1-(α - phenylethyl) - 4,5,6,7 -tetrahydroindole is obtained in equally good yield.

EXAMPLE 6

Preparation of 1-benzyl-5-hydroxymethylene-4-oxo-4,5,6,7-tetrahydroindole

A stirred, ice-cooled suspension of 19.5 g. of sodium methoxide in 255 ml. of benzene is treated, under nitrogen, with a solution of 20.0 g. of 1-benzyl-4-oxo-4,5,6,7-tetrahydroindole and 26.4 g. of ethyl formate in 225 ml. of benzene. The mixture is kept at 20° C. for 16 hours, then heated at reflux temperature for 2 hours. It is cooled and treated with 400 ml. of 5% sodium hydroxide solution. The benzene layer is extracted with 200 ml. of 5% sodium hydroxide solution and the combined alkaline extracts are cooled in an ice bath, layered with 250 ml. of methylene chloride and acidified to pH 6 with hydrochloric acid. The organic layer is washed with water, dried and concentrated. Trituration with ether causes the oily residue to crystallize. Recrystallization from ether-hexane affords 18.0 g. of the desired product as white solid, melting point 45–48° C.

EXAMPLE 7

Preparation of 1-(β-phenylethyl)-5-hydroxymethylene-4-oxo-4,5,6,7-tetrahydroindole Following the general procedure of Example 6, 1-(β-phenylethyl)-4-oxo-4,5,6,7-tetrahydroindole is treated with ethyl formate in the presence of sodium methoxide to give the 1-(β-phenylethyl)-5-hydroxymethylene-4-oxo - 4,5,6,7-tetrahydroindole.

EXAMPLE 8

Preparation of 1-benzyl-5-phenyl-4-oxo-4,5,6,7-tetrahydroindole

To a solution of sodium t-butoxide, prepared from 0.69 g. of sodium and 250 ml. of t-butanol, is added to 6.76 g. of 1-benzyl-5-hydroxymethylene-4-oxo-4,5,6,7-tetrahydroindole and 9.50 g. of diphenyliodonium chloride. The mixture is stirred at reflux temperature for 22 hours, then concentrated under reduced pressure. The residue is treated with water and methylene chloride. The organic layer is washed with sodium bicarbonate solution, dried and concentrated. A solution of the residual oil in 250 ml. of methanol is treated with 4.0 g. of sodium methoxide at reflux temperature for two hours and then concentrated. The residual brown solid was washed well with ether and then recrystallized from methanol. This procedure gave the desired product (4.3 g.) as white crystals, melting point 108–109° C.

EXAMPLE 9

Preparation of 1-(β-phenylethyl)-5-phenyl-4-oxo-4,5,6,7-tetrahydroindole

By replacing the 1-benzyl-5-hydroxymethylene-4-oxo-4,5,6,7-tetrahydroindole employed in Example 8 with an equimolecular quantity of 1-(β-phenylethyl)-5-hydroxymethylene-4-oxo-4,5,6,7-tetrahydroindole and following substantially the same procedure described in Example 8, there is obtained the 1-(β-phenylethyl)-5-phenyl-4-oxo-4,5,6,7-tetrahydroindole.

EXAMPLE 10

Preparation of 1-benzyl-5-phenyl-4,5,6,7-tetrahydroindole

A suspension of 6.0 g. of 1-benzyl-5-phenyl-4-oxo-4,5,6,7-tetrahydroindole in 400 ml. of ether is treated with 1.0 g. of lithium aluminum hydride and the mixture is stirred for 24 hours. It is then treated with 6.4 ml. of saturated potassium sodium tartrate solution. The mixture is filtered and the filtrate is dried and concentrated. The oily product is further concentrated under high vacuum and then triturated with ether, whereupon it crystallizes. Recrystallization from ether-hexane affords the desired product as white crystals, melting point 70–72° C.

EXAMPLE 11

Preparation of 1-(β-phenylethyl)-5-phenyl-4,5,6,7-tetrahydroindole

The procedure of Example 10 is repeated, substituting an equimolar amount of 1-(β-phenylethyl)-5-phenyl-4-oxo-4,5,6,7-tetrahydroindole for the 1-benzyl-5-phenyl-4-oxo-4,5,6,7-tetrahydroindole employed in that example. There is thus obtained the 1-(β-phenylethyl)-5-phenyl-4,5,6,7-tetrahydroindole.

We claim:

1. A compound of the formula:

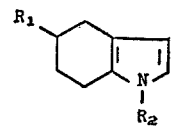

wherein $R_1$ is selected from the group consisting of hydrogen and phenyl and $R_2$ is phenyl lower alkyl having from 7 to 9 carbon atoms.

2. A compound according to claim 1 wherein $R_1$ is hydrogen and $R_2$ is benzyl.

3. A compound according to claim 1 wherein $R_1$ is hydrogen and $R_2$ is α-phenylethyl.

4. A compound according to claim 1 wherein $R_1$ is hydrogen and $R_2$ is α-phenyl-n-propyl.

5. A compound according to claim 1 wherein $R_1$ is phenyl and $R_2$ is benzyl.

6. A compound according to claim 1 wherein $R_1$ is phenyl and $R_2$ is α-phenylethyl.

7. A compound according to claim 1 wherein $R_1$ is phenyl and $R_2$ is β-phenylethyl.

8. A compound according to claim 1 wherein $R_1$ is phenyl and $R_2$ is β-phenyl-n-propyl.

References Cited

UNITED STATES PATENTS 3,226,397   12/1965   Allen et al. _____ 260—326.16 X

ALEX MAZEL, Primary Examiner

J. A. NARCAVAGE, Assistant Examiner

U.S. Cl. X.R.

260—326.16; 424—274